(12) United States Patent
Brennan et al.

(10) Patent No.: US 8,079,772 B1
(45) Date of Patent: Dec. 20, 2011

(54) MULTI-POSITION BICYCLE SEAT POST ASSEMBLY

(76) Inventors: James S. Brennan, Rodeo, CA (US); Daniel J Throckmorton, Tracy, CA (US)

( * ) Notice: Subject to any disclaimer, the term of this patent is extended or adjusted under 35 U.S.C. 154(b) by 897 days.

(21) Appl. No.: 11/644,235

(22) Filed: Dec. 21, 2006

(51) Int. Cl.
*F16B 7/10* (2006.01)

(52) U.S. Cl. .............. 403/109.1; 403/109.3; 403/322.2

(58) Field of Classification Search ............ 403/24, 403/109.1, 109.2, 109.3, 322.2, DIG. 6; 248/295.11, 248/600, 601, 623, 624
See application file for complete search history.

(56) References Cited

U.S. PATENT DOCUMENTS

| | | | |
|---|---|---|---|
| 510,993 A | | 12/1893 | Reiss |
| 686,156 A | * | 11/1901 | Snyder ................. 280/283 |
| 2,644,504 A | | 7/1953 | Vick |
| 2,893,765 A | * | 7/1959 | Lyon |
| 3,787,972 A | * | 1/1974 | Carossino ............... 403/24 |
| 3,861,740 A | * | 1/1975 | Tajima et al. ........... 297/215.13 |
| 4,150,851 A | | 4/1979 | Cienfuegos |
| 4,776,187 A | | 10/1988 | Evans et al. |
| 4,998,422 A | | 3/1991 | Borgmann et al. |
| 5,044,592 A | | 9/1991 | Cienfuegos |
| 5,061,112 A | | 10/1991 | Monford, Jr. |
| 5,174,136 A | | 12/1992 | Thwing |
| 5,593,239 A | * | 1/1997 | Sallee ................... 403/109.3 |
| 5,660,495 A | | 8/1997 | Atsukawa |
| 5,713,555 A | | 2/1998 | Zurfluh et al. |
| 5,829,733 A | | 11/1998 | Becker |
| 5,927,738 A | | 7/1999 | Kesinger |
| 6,179,302 B1 | * | 1/2001 | Gauthier et al. ........... 403/322.2 |
| 6,202,971 B1 | | 3/2001 | Duncan |
| 6,354,557 B1 | | 3/2002 | Walsh |
| 6,478,278 B1 | | 11/2002 | Duncan |
| 6,585,215 B2 | | 7/2003 | Duncan |
| 6,631,947 B2 | | 10/2003 | Faltings |
| 7,025,522 B2 | | 4/2006 | Sicz et al. |
| 7,252,453 B1 | * | 8/2007 | Little ................... 403/322.2 |

FOREIGN PATENT DOCUMENTS

| | | | |
|---|---|---|---|
| EP | 1215113 A2 | * | 6/2002 |
| FR | 885282 | * | 9/1943 |
| FR | 59322 | * | 5/1954 |
| FR | 2758305 A1 | * | 7/1998 |
| GB | 517790 | * | 2/1940 |
| NL | 1009221 | * | 2/2000 |

\* cited by examiner

*Primary Examiner* — Victor MacArthur
(74) *Attorney, Agent, or Firm* — LaRiviere, Grubman & Payne, LLP

(57) ABSTRACT

An adjustable height seat post for bicycles that comprises an inner tube slidably contained within an outer tube which supports a bicycle seat. The outer tube clamps into a bicycle frame and contains a spring which acts to force the inner tube upward. The inner tube is allowed longitudinal movement within the fixed outer tube via a locking mechanism that forces ball bearings into pockets or channels on the inner tube. The locking mechanism can be remotely activated with a handlebar mounted lever or manually with a seat post mounted lever.

5 Claims, 6 Drawing Sheets

MULTI-POSITION BICYCLE SEAT POST ASSEMBLY

FEDERALLY SPONSORED RESEARCH

Not Applicable

SEQUENCE LISTING OF PROGRAM

Not Applicable

BACKGROUND OF THE INVENTION

1. Field of the Invention

The invention relates to a multi-position adjustable height seat post, specifically a tube within a tube that allows for the adjustment of seat height to multiple positions while riding a bicycle.

2. Description of the Prior Art

Cyclists, specifically those involved in mountain biking, find that it is beneficial to have a variety of seat height options while riding a bicycle. Seat height options are desired because they afford the rider greater control of the bicycle over widely varying terrain.
Riders descending steep or difficult terrain will benefit from a much lower seat height, thus allowing them to lower their center of gravity increasing their control over the bicycle. While riding on less difficult terrain a rider may want to only slightly lower their seat height for improved cornering, yet still maintain near full leg extension for good power transfer. Riding flat terrain or climbing the rider will want the seat at a ride height so as to obtain near full leg extension while remaining seated for optimal power transfer to the pedals.

Other seat posts have been proposed that allow the user to adjust the height of the seat to multiple positions while riding. The typical form exhibited by these seat posts is a tube within a tube with some form of locking mechanism. The outer tube mounts into a bicycle frame, while the inner tube inserts into the outer tube and carries a mount for the seat. The locking mechanisms come in many forms. There are two notable examples currently on the market. The first type, the Gravity Dropper seat post (U.S. Pat. No. 7,025,522 B2), uses a pin type mechanism wherein a pin from the outer tube is used to support the inner tube in multiple positions. The second type, the Speedball seat post by Maverick, is a pneumatically operated tube within a tube allowing infinite adjustability from 0 to 3 inches.

While both of these seat posts perform there intended duties we believe they have their shortcomings. In the case of the Gravity Dropper seat post a number of disadvantages are present:

(a) spring force acting on the inner tube exerts tremendous pressure on the locking pin causing it to become stuck in the inner tube, not allowing the inner tube to release from the outer tube. The rider has to place pressure on the inner tube opposite that of the spring force to release to pin from the inner post. This action creates unnecessary rider movement thus a loss of momentum and power transfer to the pedals.

(b) another issue associated with the Gravity Dropper is that the hole drilled in the inner tube to accept the locking pin of the locking mechanism creates a stress riser which can lead to a failure of the inner tube.

(c) another issue is manual adjustment of rotational and for-aft play with the use of a crimp nut. This adjustment requires the user to be mechanical inclined or requires the service of a mechanic at a local bicycle shop.

In the case of the Speedball seat post a number of disadvantages are present:

(a) seat height adjustment and immobilization is obtained with the use of pneumatic force. Containing the pressure required to operate the pneumatics of the seat post requires the use of seals which may leak causing the failure of the locking mechanism.

(b) the seat post is also limited to larger diameter bicycle seat tubes of 30.9 mm or greater. This large diameter is greater than the most common size seat tube of 27.2 mm in diameter, therefore the Speedball is not available to most of the bicycle market.

(c) the seat post offer no means to adjust rotational or for-aft play as it becomes worn with use.

OBJECTS AND ADVANTAGES

Accordingly, several objects and advantages of the present invention are:

(a) to provide a multi-position adjustable height seat post with a locking mechanism that controllably releases irrespective of spring forces exerted upon the inner post;

(b) to provide a multi-position adjustable height seat post wherein the locking mechanism does not create a weak point within the inner or outer tube;

(c) to provide a multi-position adjustable height seat post that relies solely on mechanical actuation and hence requires no seals;

(d) to provide a multi-position adjustable height seat post that is of a diameter as to be compatible with the majority of bicycle frames (e) to provide a multi-position adjustable height seat post that self adjusts with respect to rotational and for-aft movement.

(f) to provide a multi-position adjustable height seat post that requires a minimal amount of user maintenance to remain operational.

Further objects and advantages are to provide a multi-position adjustable height seat post that is simple to operate, easy to maintain, light weight, and very robust. Still further objects and advantages will become apparent from a consideration of the ensuing description and drawings.

SUMMARY OF THE INVENTION

The invention provides for a multi-position adjustable height bicycle seat post assembly comprising an inner tube slidably supported within an outer tube. The outer tube at a diameter so as to be received in the seat tube of a bicycle. The inner tube is adjustable, moving freely within the outer tube when not in a locked position. The direction of movement is based upon rider input. Either downward via rider weight or upward via spring force. The outer tube accommodates a locking assembly consisting of ball bearings, a lock ring, a compression lever, a spring, and an upper and lower retaining unit. The locking mechanism works by forcing ball bearings via the lock ring into corresponding pockets on the inner tube through holes in the outer tube. The inner tube can have multiple positions of height adjustability depending on the number of pockets provided in the inner tube. The lock ring is cut with a steep angle at its top portion transitioning to a shallower angle below the steep angle. In the locked position the lock ring is forced upwards onto its shallow angle via spring force which holds the ball bearings in the corresponding pockets within the inner tube. This shallow angle along with constant spring force on the lock ring allows the locking mechanism to self adjust along the shallow angle of the lock ring as the seat post wears into its working position. Unlocking the mechanism consists of forcing the lock ring off its shallow angle position, past its steep angled position, and onto an upper zero angled position. This allows the ball bearings clearance to exit the pockets of the inner tube so that the inner tube moves freely within the outer tube.

Secondarily, the ball bearings are used to keep the inner post from twisting side to side as it travels longitudinally from position to position. This is done by forcing the ball bearings to track within channels of the inner tube. The channels run vertically from pocket to pocket along the inner tube. The inner tube is under constant force from a spring contained within the outer tube acting to extend the inner tube to its most extended position.

DRAWINGS

DRAWINGS

Reference Numerals

| 102 | outer tube | 104 | inner tube |
| 106 | pocket | 108 | channel |
| 110 | hole | 112 | ball bearing |
| 114 | lock ring | 116 | compression lever |
| 118 | wave spring | 120 | lower retention ring |
| 122 | C-clip | 124 | top clamp |
| 126 | bottom clamp | 128 | bolt rod |
| 130 | retaining bolts | 132 | retaining nuts |
| 134 | compression spring | 136 | retention plug |
| 137 | catch cable | 138 | snap ring |
| 202 | manual compression lever | 204 | manual retention ring |
| 302 | lower zero degree angle | 304 | five degree angle |
| 306 | forty-five degree angle | 308 | upper zero degree angle |
| 402 | actuation lever | 404 | actuation cable housing |
| 406 | actuation cable | | |

DETAILED DESCRIPTION

Referring to the figures wherein like numerals represent like parts throughout several views.

Figure 1A:
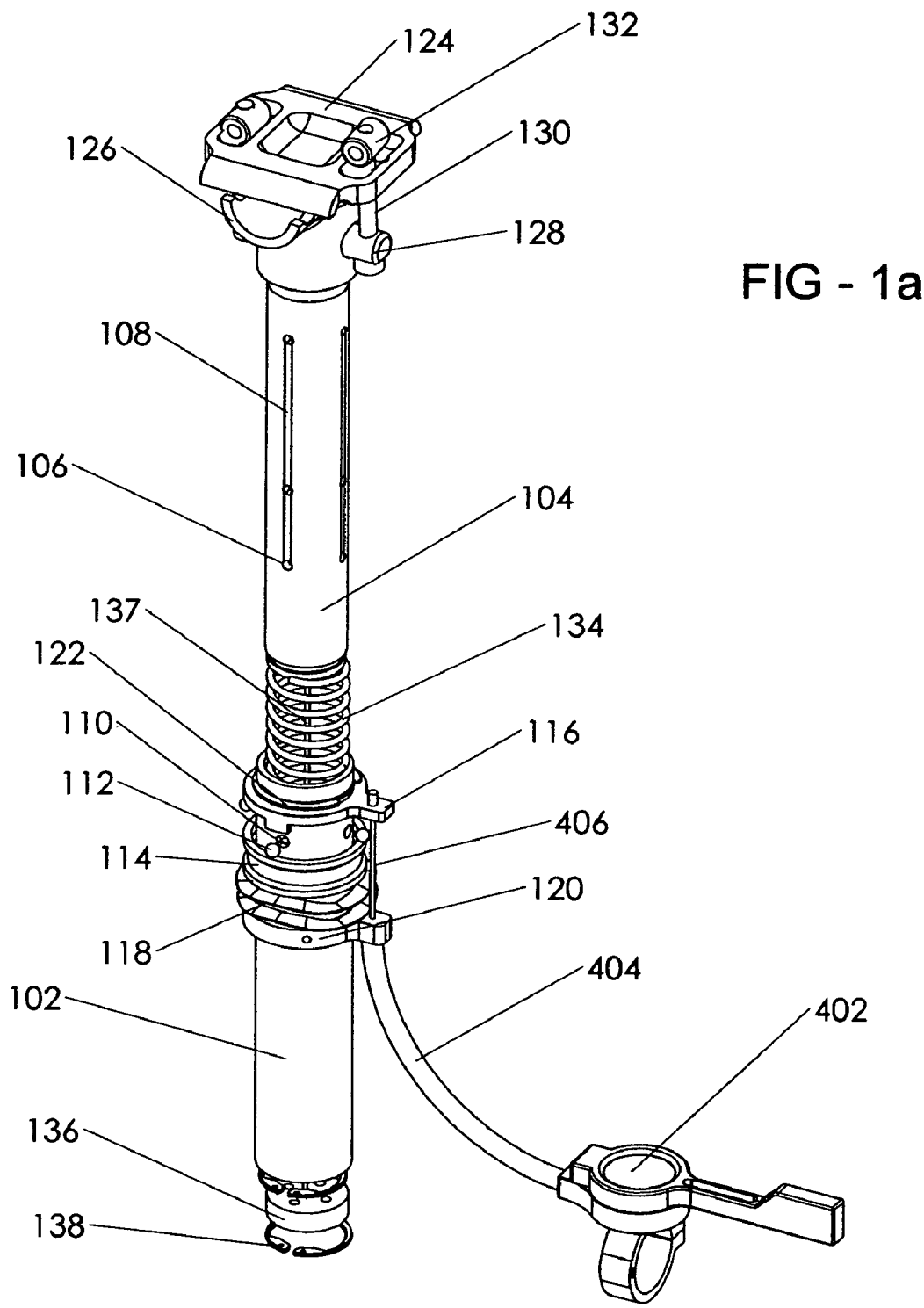
FIG. 1a is an exploded view of the adjustable height seat post.
Figure 1B:
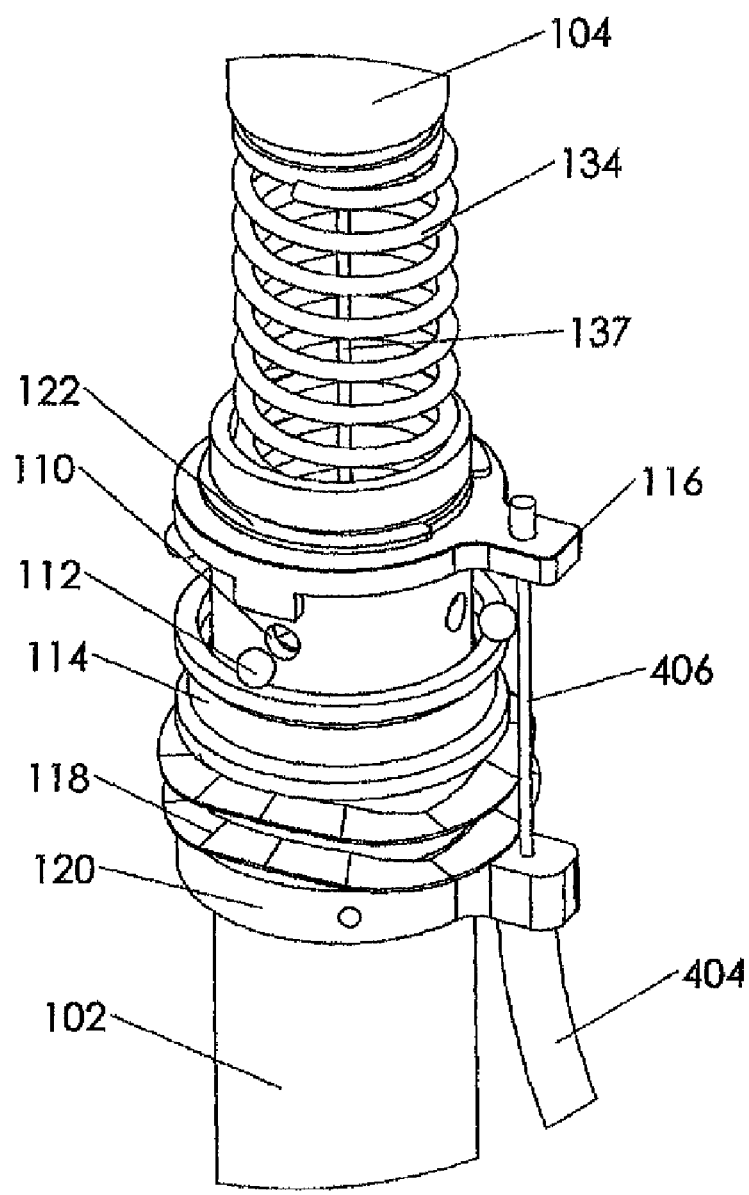
FIG. 1b is an exploded close up view of the remotely operated locking mechanism.
Figure 2:
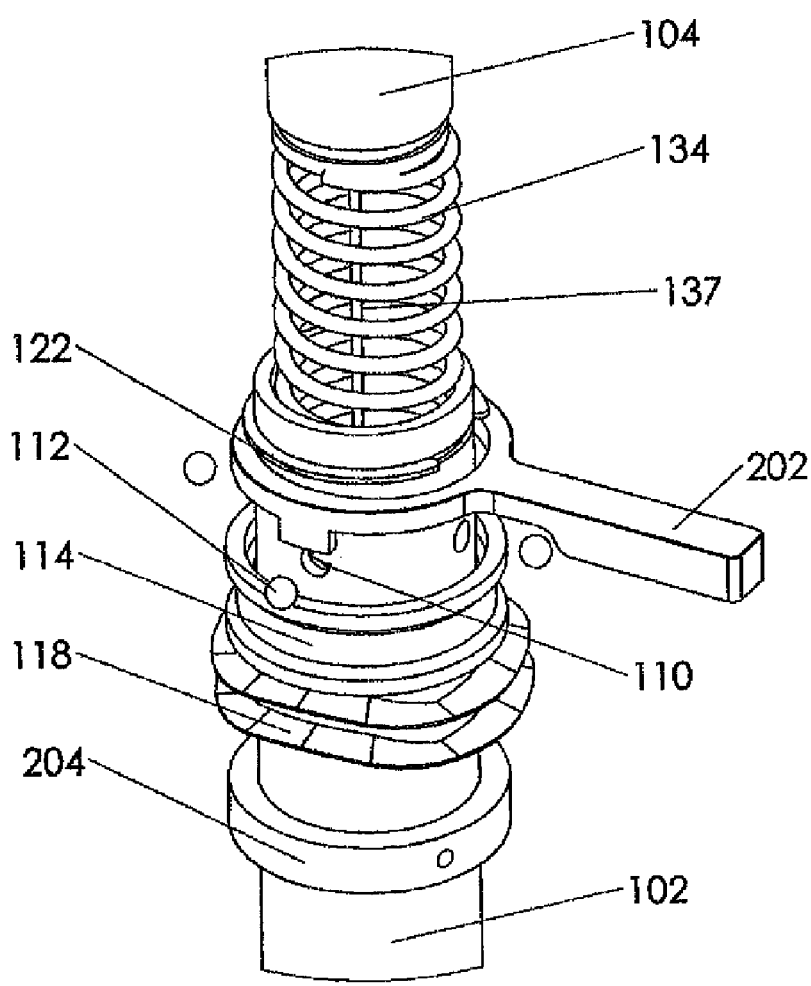
FIG. 2 is an exploded close up view of the manually operated locking mechanism.
Figure 4A:
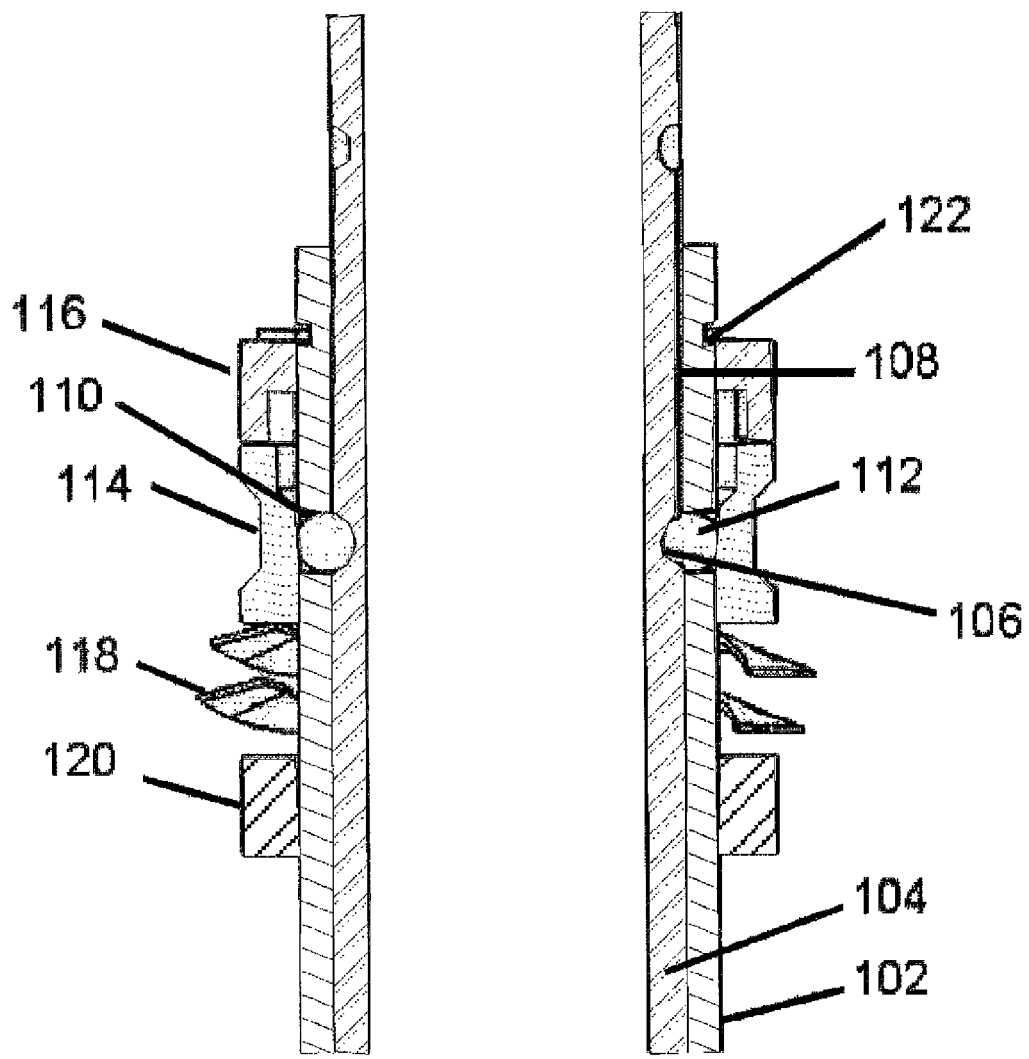
FIG. 4a is a cross sectional view of the locking mechanism in locked position.
Figure 4B:
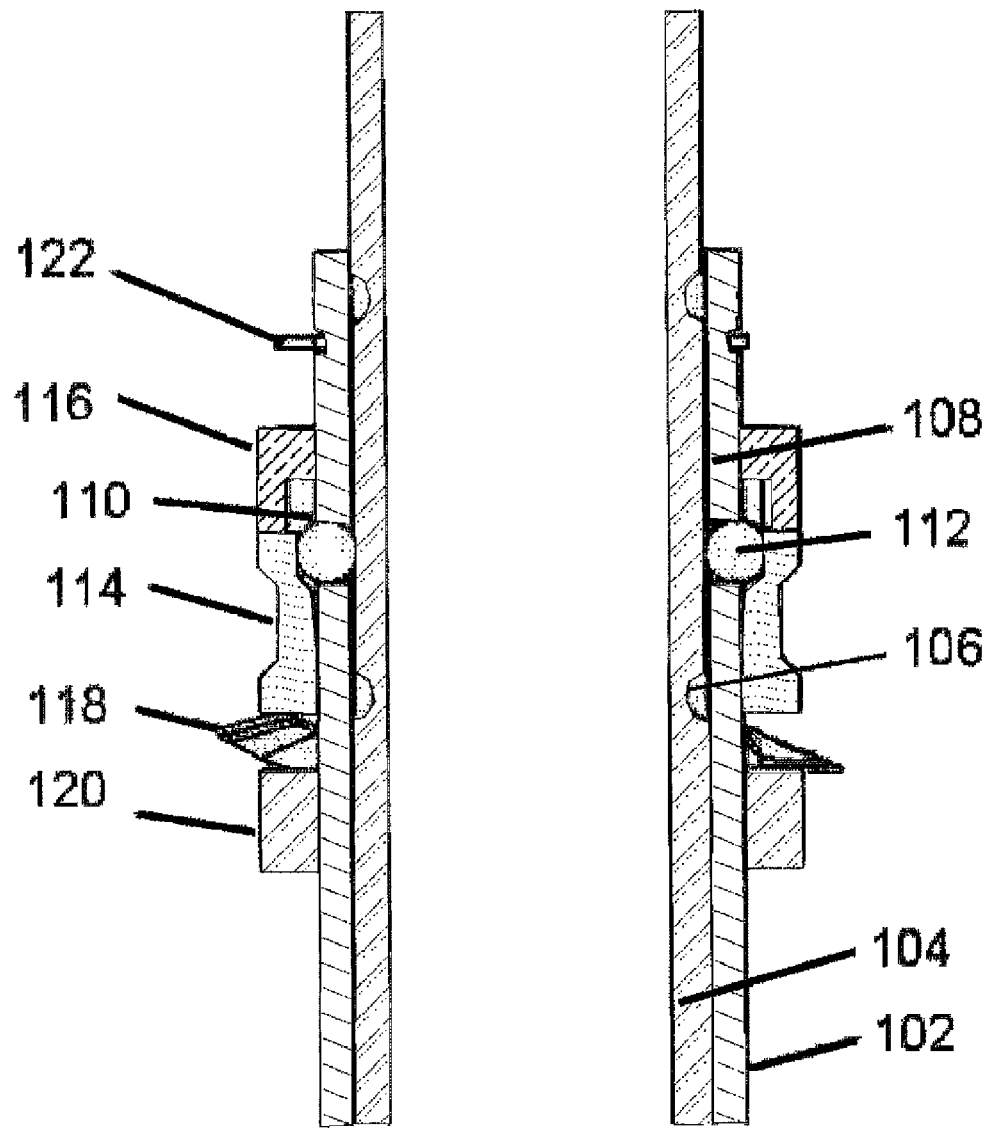
FIG. 4b is a cross sectional view of the locking mechanism in unlocked position.

Referring to FIGS. 1a and 2, the seat post assembly consists of a hollow inner tube 104 inserted slidably into a hollow outer tube 102, a compression spring 134 working to extend the inner tube 104 within the outer tube 102, and a locking mechanism. The locking mechanism, shown close up in FIG. 1b and cut away in FIGS. 4a and 4b, works to lock the inner tube 104 with respect to the outer tube 102 at a plurality of longitudinal positions. The locking mechanism can be operated by various means to unlock or lock the inner tube 104. There are two representative models of the locking mechanism assemblies. The first is a cable actuated assembly shown in FIGS. 1a and 1b, which is operated remotely via an actuation lever 402 and the second is a manually actuated lever assembly shown in FIG. 2. Their construction and operation will be described in detail below.

Preferably, the inner and outer tubes 104, 102 are fabricated of a lightweight metal that is resistant to corrosion and mechanical deformation. The preferred material for the inner and outer tubes 104, 102 is aluminum that has been hard anodized. However, any material that is capable of withstanding the stresses associated with this invention could be substituted, such as carbon fiber, all types of steel, titanium, etc.

Referring to FIGS. 1a and 2, the outer tube 102 is configured at its lower end to be received by a standard seat tube receptacle of a bicycle frame in the same manner as a standard bicycle seat post. The upper end of the outer tube 102 is configured to accept the lower end of the inner tube 104. The upper end of the inner tube 104 is fitted with mounting hardware 124-132 suitable to accept a bicycle seat and the weight of a bicycle rider. The mounting hardware consists of a top clamp 124, a bottom clamp 126, a bolt rod 128, retaining bolts 130, and retaining nuts 132. As shown in FIGS. 1a, 1b, 2 4a, and 4b, ball bearings 112 preferably, but not limited to, one-hundred-fifty-six thousandths of an inch in diameter, and consisting of, but not limited to, stainless steel are inserted into the outer tube 102. The current preferable number of ball bearings 112 is four, however any number of ball bearings 112 could be used. The ball bearings 112 protrude inward through holes 110 in the outer tube 102 contacting the inner tube 104 in either a plurality of pockets 106 or a plurality of channels 108. The currently preferred number of pockets 106 is four. However, there are various possibilities with regards to the number of pockets 106 within the inner tube 104. The currently preferred number of pocket 106 positions along the vertical axis of the inner tube 104 are three. However, there are various possibilities with regards to the number of pocket 106 positions within the inner tube 104. The currently preferred position of pockets 106 are at zero, one and three inches along the vertical axis of the inner tube 104. However, there are various possibilities with regards to the position of pockets 106 within the inner tube 104. The currently preferable number of channels 108 within the inner tube 104 are four. However, there are various possibilities with regards to the number of channels 108 within the inner tube 104. The currently preferred orientation of the channels is vertical along the axis of the inner tube 104 from pocket 106 to pocket 106. However, there are various possibilities with regards to the orientation of channels 108 within the inner tube 104. The balls bearings 112 are used both as guides, tracking along vertical channels 108 within the inner tube 104, and as locking elements when forced into pockets 106 on the inner tube 104. As guides, the ball bearings 112 track from pocket 106 to pocket 106 along the channels of the inner tube 104 preventing rotational movement of the inner tube 104 with respect to the outer tube 102. The ball bearings 112 along with a catch cable 137 limit the outward movement of the inner tube 104 preventing complete separation of the inner tube 104 from the outer tube 102. A retention plug 136, held in place by snap rings 138 is used to contain a compression spring 134 within the outer tube 102. The compression spring 134 acts with constant spring force upon the inner tube 104 to extend the inner post 104 longitudinally outward of the outer post 102 to its fully extended position.

Figure 3A:
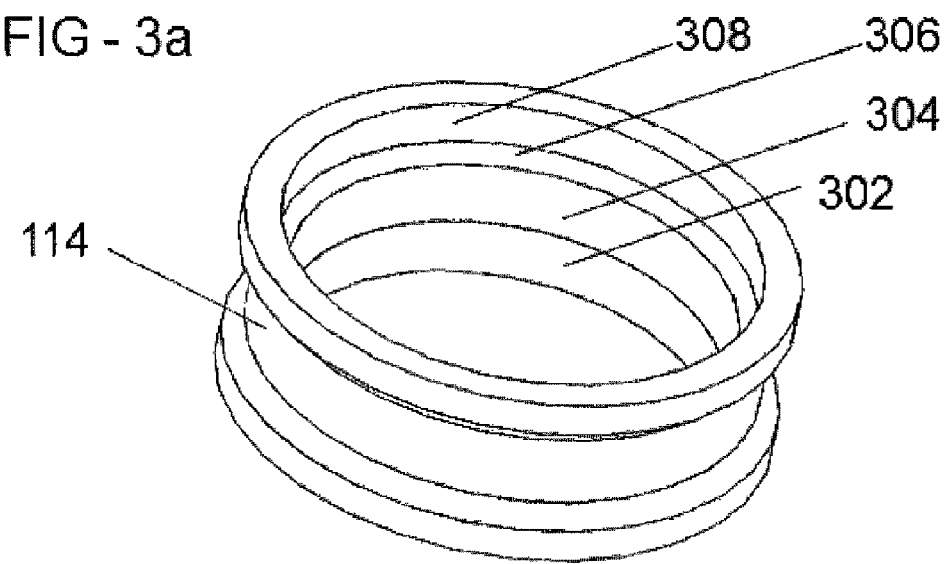
FIG. 3a is top down side view of the lock ring.
Figure 3B:
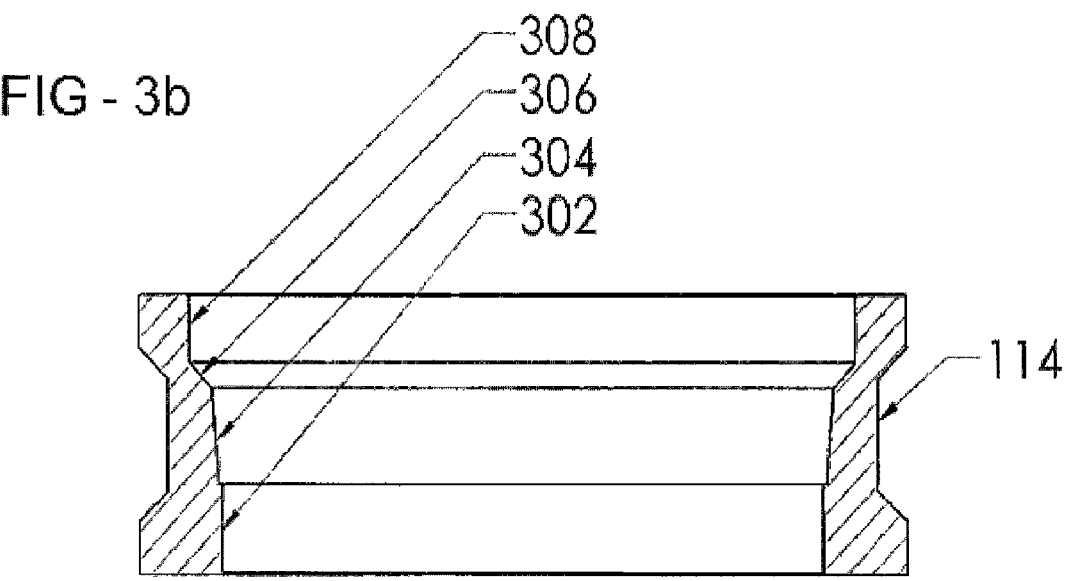
FIG. 3b is a cross sectional view of the lock ring.

The locking assembly shown in FIGS. 1a, 1b, 2, 4a and 4b with close ups of the lock ring 114 in FIGS. 3a and 3b mounts externally to the outer tube 102. The locking assembly comprises an upper retention C-clip 122, a compression lever 116, a lock ring 114, ball bearings 112, a wave spring 118, and a lower retention ring 120. The locking assembly acts to lock or release the inner tube 104 with respect to the outer tube 102 by forcing or releasing ball bearings 112 into or out of pockets 106 on the inner tube 104 through holes 110 on the outer tube 102. Outward radial movement of the ball bearings 112 is either permitted or not permitted by the longitudinal position of the lock ring 114 along the axis of the outer tube 102 with respect to pockets 106 in the inner tube 104. A central component to the locking assembly is the lock ring 114 which consists of a material compatible with the outer tube 102 such as, but not limited to, stainless steel. The inner side of the lock ring 114 consists of, but is not limited to, four angles that act upon the ball bearings 112 outer tube 102. Starting from the lower end of the lock ring 114 the angles are, but are not limited to, a lower zero 302, five 304, forty-five 306, and an upper zero 308.

Any of the lock ring angles mentioned above can be altered and still perform a similar function, however these angles are currently preferred. At the lower most end or bottom of the lock ring 114 the lower zero degree angle 302 is machined a diameter a few thousands of an inch over that of the outer tube 102, and to a length of one-hundred-forty-five thousandths of an inch. However, many different lower zero degree angle 302 lengths are possible to achieve the desired objective. The lower zero degree angle 302 creates a contact point for the lock ring 114 on the outer tube 102 while remaining slidable. The second position up from the bottom of the lock ring 114 is the five degree angle 304; the locked position. The five degree angle 304 begins at the upper end of the lower zero degree angle 302 and angles outward in relation to the outer tube 102. In the locked position the lock ring 114 makes contact with the ball bearings 112 on its five degree angle 304. The five degree angle 304 forces ball bearings 112 into pockets 106 of the inner tube 104 through holes 110 of the outer tube 102. This locks the inner tube 104 with respect the outer tube 102. In the locked position a portion of the ball bearings 112 reside both in the pockets 106 of the inner tube 104 and in the holes 110 of the outer tube 102, while minimally protruding out of the holes 110 of the outer tube 102 to contact the lock ring 114 at its five degree angle 304. The length of the five degree angle 304 is currently preferred to be one-hundred-fifty thousandths of an inch, however many different five degree angle 304 lengths are possible to achieve the desired objective. The length of the five degree angle 304 enables the lock ring 114 to self-adjust as the pockets 106 and ball bearings 112 wear with use.

The self-adjustment minimizes rotational and for-aft play or movement of the inner tube 104 with respect to the outer tube 102. Beginning at the upper edge of the five degree angle 304 is a forty-five degree angle 306 which is outwardly angled with respect to the outer tube 102. The forty-five degree angle 306 is currently preferred at forty thousandths of an inch, however many different forty-five degree angle 306 lengths are possible to achieve the desired objective. The forty-five degree angle 306 transitions the lock ring 114 from its five degree angle 304 to its upper zero degree angle 308, the unlocked position. The forty-five degree angle 306 allows the ball bearings 112 to transition smoothly from the five degree angle 304 to the upper zero degree angle 308, and vice versa. The currently preferred length of the upper zero degree angle 308 is one-hundred-ten thousandths of an inch, however many different upper zero degree angle 308 lengths are possible to achieve the desired objective. The upper zero degree angle 308 allows the ball bearings 112 clearance to radially exit the pockets 106 of the inner tube 104, however not allowing sufficient clearance to exit the channels 108 of the inner tube 104. In the unlocked position a portion of the ball bearings 112 reside both in the channels 108 of the inner tube 104 and the holes 110 of the outer tube 102, while protruding out of the holes 110 of the outer tube 102 to contact the lock ring 114 at its upper zero degree angle 308. In the upper zero angle 308 position the inner tube 104 is free to move longitudinally within the outer tube 102. A wave spring 118, preloaded by a lower retention ring 120, act with constant upward vertical spring force on the bottom of the lock ring 114. The upward force placed on the lock ring 114 acts to maintain the lock ring in its five degree angle 304 position. Hence, the resting state of the locking assembly is a locked position. To achieve an unlocked state actuation is required.

Actuation of the locking assembly is done one of two ways, either remotely, FIGS. 1a and 1b or manually, FIG. 2.

Remote operation of the locking assembly is done with, but not limited to, an actuation lever 402. The actuation lever 402 is connected to the locking assembly via a standard actuation cable housing 404 and an actuation cable 406. The lower retention ring 120 has a tab that receives the actuation cable 406 and actuation cable housing 404 from the actuation lever 402. The actuation cable housing 404 in turn supports the actuation cable 406 which is connected to the compression lever 116 on one end and the actuation lever 402 at the other end. Actuation of the actuation lever 402 works to pull the compression lever 116 downward, hence forcing the lock ring 114 downward. The downward actuation of the lock ring 114 counteracts the upward force exerted by the wave spring 118 on the lock ring 114, forcing the lock ring 114 into the unlocked position. This allows the ball bearings 112 to exit the pockets 106 of the inner tube 104 allowing the inner tube 104 to move longitudinally within the outer tube 102. Upon release of pressure from the actuation lever 402 the compression lever 116 relaxes downward force on the lock ring 114 and the wave spring 118 forces the lock ring 114 upward into the locked position. This forces the ball bearings 112 into the pockets 106 of the inner tube 104 immobilizing or locking it within the outer tube 102.

In the manual locking assembly shown in FIG. 2 manually actuating the manual compression lever 202 downward forces the lock ring 114 downward. This counteracts the upward force exerted by the wave spring 118 which is preloaded with a manual retention ring 204, unlocking the locking assembly. The ball bearings 112 exit the pockets 106 of the inner tube 104 allowing the inner tube 104 to move longitudinally within the outer tube 102. Upon release of the manual compression lever 202 the lock ring 114 is forced upward via the spring force of the wave spring 118 thereby forcing the ball bearings into the pockets 106 of the inner tube 104 immobilizing or locking it within the outer tube 102.

Although the description above contains many specifications, these should not be construed as limiting the scope of the embodiment but as merely providing illustrations of some of the presently preferred embodiments. For example, the lock ring 114 can have other angles that act upon the ball bearings 112 and still provide a similar function, the wave spring 118 can be replaced with a compression spring, etc.

Thus the scope of the embodiment should be determined by the appended claims and their legal equivalents, rather than by the examples given.

We claim:

1. A multi-position adjustable height bicycle seat post assembly for attaching a bicycle seat to a bicycle frame, comprising:
   a. an inner tube, comprising:
      i. an upper end and a lower end; and b. an outer tube, comprising:
  i. an upper end and a lower end; and
  ii. wherein said outer tube has a diameter greater than that of the inner tube, and said outer tube is configured to allow at least a portion of the lower end of the inner tube to slide into the upper end of the outer tube;
c. an assembly for locking, unlocking, and preventing rotation of the inner tube with respect to the outer tube, comprising:
  i. a lock ring element;
  ii. a plurality of straight parallel grooves located in vertical alignment along a portion of the inner tube;
  iii. detent elements located in the straight parallel grooves of the inner tube;
  iv. a plurality of holes in the outer tube configured to generally align with the straight parallel grooves of the inner tube; and
  v. a plurality of spherical elements located in the holes of the outer tube and between the lock ring element and the inner tube; and
d. an extending element for extending the inner tube longitudinally to its fully extended position with respect to said outer tube; and
e. wherein the lock ring element:
  i. contains a plurality of angled ramps that act upon the spherical elements
  ii. is placed into a locked position, by forcibly retaining the spherical elements within the holes of the outer tube and the detents of the inner tube: and
  iii. is placed into an unlocked position, by allowing the spherical elements to exit the detents of the inner tube, and entering the grooves of the inner tube, allowing said inner tube to become slidable within the outer tube.

2. The assembly of claim 1 wherein the plurality of spherical locking elements are located within the lock ring element, and within the plurality of holes in said outer tube and the plurality of detents in the inner tube.

3. The assembly of claim 1, wherein the plurality of spherical elements are located in the straight parallel grooves of the inner tube.

4. The assembly of claim 1 wherein said lock ring element is slidable along the outer tube.

5. The assembly of claim 1 wherein said spherical elements are a plurality ball bearings.

* * * * *